(12) United States Patent
Kibler et al.

(10) Patent No.: US 9,507,642 B2
(45) Date of Patent: Nov. 29, 2016

(54) METHOD AND SYSTEMS FOR SUB-ALLOCATING COMPUTATIONAL RESOURCES

(71) Applicant: Xerox Corporation, Norwalk, CT (US)

(72) Inventors: Wendell L Kibler, Rochester, NY (US); Paul R Austin, Webster, NY (US); Arturo M Lorenzo, Fairport, NY (US); Gueyoung Jung, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 268 days.

(21) Appl. No.: 13/693,130

(22) Filed: Dec. 4, 2012

(65) Prior Publication Data

US 2014/0156518 A1 Jun. 5, 2014

(51) Int. Cl.
*G06Q 20/32* (2012.01)
*G06F 9/50* (2006.01)
*H04L 12/14* (2006.01)
*H04L 12/24* (2006.01)
*H04L 29/12* (2006.01)

(52) U.S. Cl.
CPC ......... *G06F 9/5072* (2013.01); *H04L 12/1403* (2013.01); *H04L 12/1432* (2013.01); *H04L 41/5096* (2013.01); *H04L 61/2007* (2013.01)

(58) Field of Classification Search
USPC .................................................... 705/35, 40
See application file for complete search history.

(56) References Cited

U.S. PATENT DOCUMENTS

| | | | | |
|---|---|---|---|---|
| 5,835,897 A * | 11/1998 | Dang | ............................... | 705/2 |
| 6,012,035 A * | 1/2000 | Freeman et al. | ................... | 705/2 |
| 6,112,183 A * | 8/2000 | Swanson et al. | ................. | 705/2 |
| 6,324,516 B1 * | 11/2001 | Shults et al. | ....................... | 705/2 |
| 6,826,536 B1 * | 11/2004 | Forman | ............................ | 705/4 |
| 6,915,265 B1 * | 7/2005 | Johnson | ............................ | 705/2 |
| 6,934,692 B1 * | 8/2005 | Duncan | ........................... | 705/35 |
| 7,191,150 B1 * | 3/2007 | Shao et al. | ...................... | 705/38 |
| 7,340,401 B1 * | 3/2008 | Koenig et al. | .................... | 705/2 |
| 7,356,516 B2 * | 4/2008 | Richey et al. | .................. | 705/80 |
| 7,392,201 B1 * | 6/2008 | Binns et al. | ...................... | 705/4 |
| 7,395,219 B2 * | 7/2008 | Strech | .............................. | 705/4 |
| 7,467,094 B2 * | 12/2008 | Rosenfeld et al. | ............... | 705/3 |
| 7,657,441 B2 * | 2/2010 | Richey et al. | ................. | 705/1.1 |
| 7,870,044 B2 * | 1/2011 | Robertson | ....................... | 705/34 |
| 8,000,977 B2 * | 8/2011 | Achan | ............................... | 705/2 |
| 8,037,187 B2 * | 10/2011 | Dawson et al. | .............. | 709/226 |

(Continued)

OTHER PUBLICATIONS

C. Clark, K. Fraser, S. Hand, J. G. Hansen, E. Jul, C. Limpach, I. Pratt, and A. Warfield. Live migration of virtual machines. In *Proc. NSDI '05*, May 2005.

(Continued)

*Primary Examiner* — Hai Tran
(74) *Attorney, Agent, or Firm* — Jones Robb, PLLC (57) ABSTRACT

The disclosed embodiments relate to systems and methods for method and systems for sub-allocating computational resources. A first computing device receives information associated with a first set of computational resources from a cloud infrastructure. The first set of computational resources has been allocated to the first computing device by the cloud infrastructure. A first set of parameters associated with a workflow received by the first computing device is determined. The first set of parameters is indicative of a need of the first set of computational resources by the first computing device. One or more computational resources from the first set of computational resources are sub-allocated based on the determined first set of parameters.

19 Claims, 6 Drawing Sheets

(56) References Cited

U.S. PATENT DOCUMENTS

| | | |
|---|---|---|
| 8,359,223 B2* | 1/2013 | Chi et al. .................... 705/7.22 |
| 8,527,292 B1* | 9/2013 | Ozden ............................. 705/2 |
| 8,538,806 B2* | 9/2013 | Kuznetsov ................ 705/14.17 |
| 2002/0077867 A1* | 6/2002 | Gittins et al. ..................... 705/4 |
| 2003/0130873 A1* | 7/2003 | Nevin et al. ...................... 705/3 |
| 2003/0225690 A1* | 12/2003 | Eaton ............................ 705/40 |
| 2003/0233292 A1* | 12/2003 | Richey et al. ................. 705/28 |
| 2004/0083145 A1* | 4/2004 | Kobayashi et al. ............ 705/31 |
| 2004/0153382 A1* | 8/2004 | Boccuzzi et al. .............. 705/34 |
| 2005/0080821 A1* | 4/2005 | Breil et al. ................ 707/104.1 |
| 2006/0247968 A1* | 11/2006 | Kadry ............................ 705/14 |
| 2007/0250352 A1* | 10/2007 | Tawil .............................. 705/4 |
| 2008/0059351 A1* | 3/2008 | Richey et al. ................. 705/35 |
| 2009/0048877 A1* | 2/2009 | Binns et al. ..................... 705/4 |
| 2010/0325406 A1* | 12/2010 | Ukeda et al. .................... 713/2 |
| 2011/0179141 A1* | 7/2011 | Ravichandran et al. ..... 709/218 |
| 2012/0089494 A1* | 4/2012 | Danezis et al. ................ 705/34 |
| 2012/0110055 A1* | 5/2012 | Van Biljon et al. .......... 709/201 |
| 2012/0116937 A1* | 5/2012 | Van Biljon et al. ............ 705/34 |
| 2012/0198073 A1* | 8/2012 | Srikanth et al. .............. 709/226 |
| 2012/0254567 A1* | 10/2012 | Umbehocker ................ 711/162 |
| 2012/0271949 A1* | 10/2012 | Radhakrishnan et al. .... 709/226 |
| 2012/0330711 A1* | 12/2012 | Jain et al. .................... 705/7.23 |
| 2012/0331113 A1* | 12/2012 | Jain et al. ..................... 709/220 |
| 2013/0091284 A1* | 4/2013 | Rothschild ................... 709/226 |
| 2013/0103464 A1* | 4/2013 | Kuznetsov ................... 705/14.4 |
| 2013/0339226 A1* | 12/2013 | Kuznetsov .................... 705/39 |
| 2014/0136269 A1* | 5/2014 | Wasser ........................ 705/7.22 |
| 2014/0142963 A1* | 5/2014 | Hill et al. ......................... 705/2 |

OTHER PUBLICATIONS

U.S. Appl. No. 13/540,639, filed Jul. 3, 2012; Method and System for Handling Load on a Service Component in a Network, by Jung et al.

* cited by examiner

METHOD AND SYSTEMS FOR SUB-ALLOCATING COMPUTATIONAL RESOURCES

TECHNICAL FIELD

The presently disclosed embodiments are related, in general, to allocation of computational resources. More particularly, the presently disclosed embodiments are related to systems and methods for sub-allocating the computational resources through an online marketplace.

BACKGROUND

Advancements in the field of virtualization and shared computing have led to the development of cloud computing infrastructure. The cloud computing infrastructure may allocate one or more computational resources to one or more computing devices. The one or more computing devices may utilize the one or more computational resources to perform predetermined operations. Examples of the computational resources may include, but are not limited to, one or more processor instances, storage space, and RAM memory space. In certain scenarios, a service level agreement (SLA) between the one or more computing devices and the cloud computing infrastructure may determine the amount of computational resources allocated to the respective computing devices. Further, the SLA may determine a billing amount that the one or more computing devices have to pay the cloud computing infrastructure for using the one or more computational resources.

In some cases, the one or more computing devices may reserve predetermined computational resources from the allocated computational resources for future use (e.g., at peak workload). Further, the one or more computing devices may not use the reserved computational resources until the one or more computing devices encounter the peak workload. However, the cloud computing infrastructure will still bill the one or more computing devices, based on the SLA, irrespective of whether the one or more computing devices has utilized the reserved computational resources.

SUMMARY

According to embodiments illustrated herein, a method implementable on a first computing device for allocating one or more computational resources is disclosed. The method includes receiving information associated with a first set of computational resources from a cloud infrastructure. The first set of computational resources has been allocated to the first computing device by the cloud infrastructure. The workflow is received by the first computing device. The first set of parameters is indicative of a need of the first set of computational resources by the first computing device. The one or more computational resources from the first set of computational resources are allocated based on the determined first set of parameters.

According to embodiments illustrated herein, a method implementable on an online marketplace server for allocating one or more computational resources received from one or more first computing devices is disclosed. The one or more computational resources are unused resources of the one or more first computing devices. The method includes receiving a first request for the one or more computational resources from one or more second computing devices. The one or more computational resources are allocated to the one or more second computing devices. Further, the method includes monitoring usage of the one or more computational resources. Finally, the method includes billing the one or more second computing devices, based on the usage.

According to embodiments illustrated herein, a first computing device for allocating one or more computational resources is disclosed. The first computing device comprises a first computational resource manager configured to receive information associated with a first set of computational resources from a cloud service provider. The first set of computational resources has been allocated to the first computing device by the cloud infrastructure. A load manager configured to determine a first set of parameters associated with a workflow, received by the first computing device. The first set of parameters is indicative of a need of the first set of computational resources by the first computing device. the first computational resource manager configured to allocate the one or more computational resources from the first set of computational resources to one or more second computing devices, based on the determined first set of parameters.

According to embodiments illustrated herein, an online marketplace server for allocating one or more computational resources received from one or more first computing devices is disclosed. The one or more computational resources are unused resources of the one or more first computing devices. The online marketplace server includes a communication manager configured to receive a first request from one or more second computing devices for the one or more computational resources. Further, the online marketplace server includes a second computational resource manager configured to allocate the one or more computational resources to the one or more second computing devices. The second computational resource manager monitors the usage of the one or more computational resources. A billing module configured to bill the one or more second computing devices, based on the usage.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

DEFINITIONS

The following terms shall have, for the purposes of this application, the respective meanings set forth below.

"Computational resources" correspond to resources utilized by a computing device to perform an operation. In an embodiment, the computational resources correspond to, but are not limited to, processor instances, storage space, and RAM space. In an embodiment, the computational resources may further correspond to, but not limited to, software applications, security services, and database services that can be utilized by the computing device.

A "cloud infrastructure" corresponds to a universal collection of computational resources over the internet (such as computing instances, storage, information hardware, various platforms, and services) and forms individual units within the virtualization environment. In an embodiment, one or more computing devices, registered with the cloud infrastructure, utilize the resources to perform respective operations. In an embodiment, cloud infrastructure may provide one or more services such as, but not limited to, Infrastructure as a service (IaaS), Platform as a service (Paas), Software as a service (SaaS), Storage as a service (STaaS), Security as a service (SECaaS), and Data as a service (DaaS).

An "Online Marketplace" refers to a type of e-commerce website where product and inventory information is provided by multiple third parties. Transactions are processed by the marketplace owner. In an embodiment, the online marketplace publishes the availability of the computational resources. Some examples of online marketplace include, but are not limited to, E-bay.com, Amazon.com, Flipkart.com, Amazon web services (AWS), Windows Azure and the like.

A "Workflow" refers to an ordered list of services, which, when executed, perform a predetermined operation. The workflow may include one or more services (e.g., subtasks) that can each be executed at the corresponding service component in the cloud infrastructure.

A "Peak workload" corresponds to a workflow that may require a computing device to utilize all of the available computational resources to perform an operation.

Figure 1:
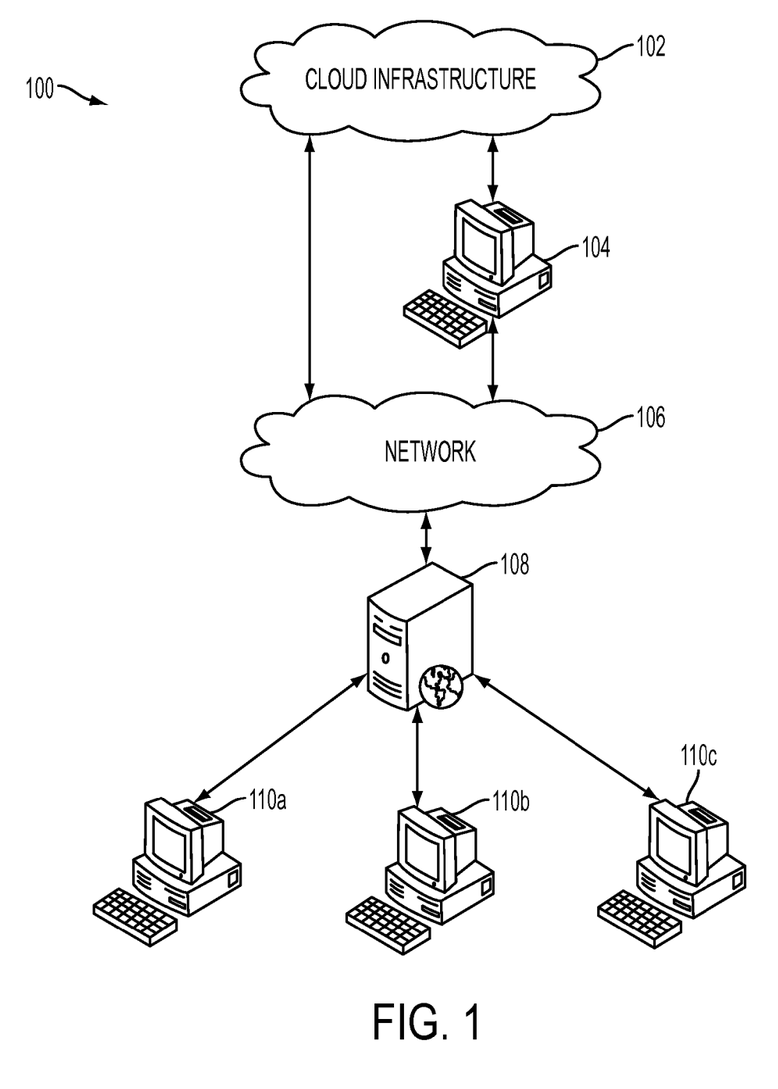
FIG. 1 is a block diagram illustrating a system environment, in which various embodiments can be implemented.

FIG. 1 is a block diagram illustrating a system environment 100, in which various embodiments can be implemented. The system environment 100 includes a cloud infrastructure 102, a first computing device 104, a network 106, an online marketplace server 108, and one or more second computing devices 110a, 110b, and 110c (hereinafter referred to as the second computing devices 110).

The cloud infrastructure 102 includes to a plurality of computing devices connected with each other over a network. In an embodiment, each of the plurality of computing devices performs a predetermined operation. For example, the cloud infrastructure 102 may include a computing device that is configured as a streaming controller. In an embodiment, the streaming controller enables seamless streaming of video and audio content. In an embodiment, the plurality of computing devices includes computing devices that are being executed in a virtualized environment (e.g., virtual machines). Further, the cloud infrastructure 102 includes a storage controller that allocates storage space and RAM space to a user of the cloud infrastructure 102. Some examples of the storage controller include, but are not limited to, Walrus Controller®, GridStore, and the like. Some examples of cloud infrastructure 102 include, but are not limited to, Amazon EC2®, Ubuntu One®, Google Drive®, etc.

The first computing device 104 receives information associated with the first set of computational resources from the cloud infrastructure 102. In an embodiment, the information associated with the one or more computational resources includes, but are not limited to, an IP address, a processor id, operating system information, RAM space, storage space, and other information that facilitates access to the first set of computational resources. In an embodiment, the first computing device 104 receives the information associated with the first set of computational resources, based on an SLA between the cloud infrastructure 102 and the first computing device 104. In an embodiment, the first computing device 104 utilizes the information to access the first set of computational resources. Further, the first computing device 104 receives a workflow from one or more users of the first computing device 104. In an embodiment, the operation performed by the first computing device 104 is determined by the workflow. The first computing device 104 utilizes the first set of computational resources to perform the operation. In an embodiment, the first computing device 104 reserves one or more computational resources from the first set of computational resources for a peak workload. In an embodiment, the first computing device 104 does not utilize the one or more computational resources during non-peak workload. In an alternate embodiment, the first computing device 104 sends information associated with the one or more computational resources to the online marketplace server 108 during the non-peak workload. Examples of the first computing device 104 include, but are not limited to, a personal computer, a laptop, a PDA, a mobile device, a tablet, or any device that has the capability of receiving the first set of computational resources. The first computing device 104 is described later in conjunction with FIG. 3.

The network 106 corresponds to a medium through which the content and the messages flow among various components (e.g., the cloud infrastructure 102, the first computing device 104, the online marketplace server 108, and the second computing devices 110) of the system environment 100. Examples of the network 106 may include, but are not limited to, a Wireless Fidelity (WiFi) network, a Wireless Area Network (WAN), a Local Area Network (LAN) or a Metropolitan Area Network (MAN). Various devices in the system environment 100 can connect to the network 106 in accordance with various wired and wireless communication protocols, such as Transmission Control Protocol and Internet Protocol (TCP/IP) User Datagram Protocol (UDP), 2G, 3G, or 4G communication protocols.

The online marketplace server 108 receives information associated the one or more computational resources from the first computing device 104. The online marketplace server 108 publishes the availability of the one or more computational resources. In an embodiment, the online marketplace server 108 publishes the availability of the one or more computational resources over at least one of a portal, a website, an application programming interface (API), or a blog. In an embodiment, the online marketplace server 108 sub-allocates the one or more computational resources to the at least one of the second computing devices 110. The online marketplace server 108 is described later in conjunction with FIG. 5.

The second computing devices 110 request for the one or more computational resources through the online marketplace server 108. Further, the second computing devices 110 receive the one or more computational resources from the online marketplace server 108. Some examples of the second computing devices 110 include, but are not limited to, a personal computer, a laptop, a PDA, a mobile device, a tablet, or any device that has a capability of receiving the one or more computational resources.

The operation and interaction between the various components of the system environment 100 is described later in conjunction with FIG. 2.

Figure 2:
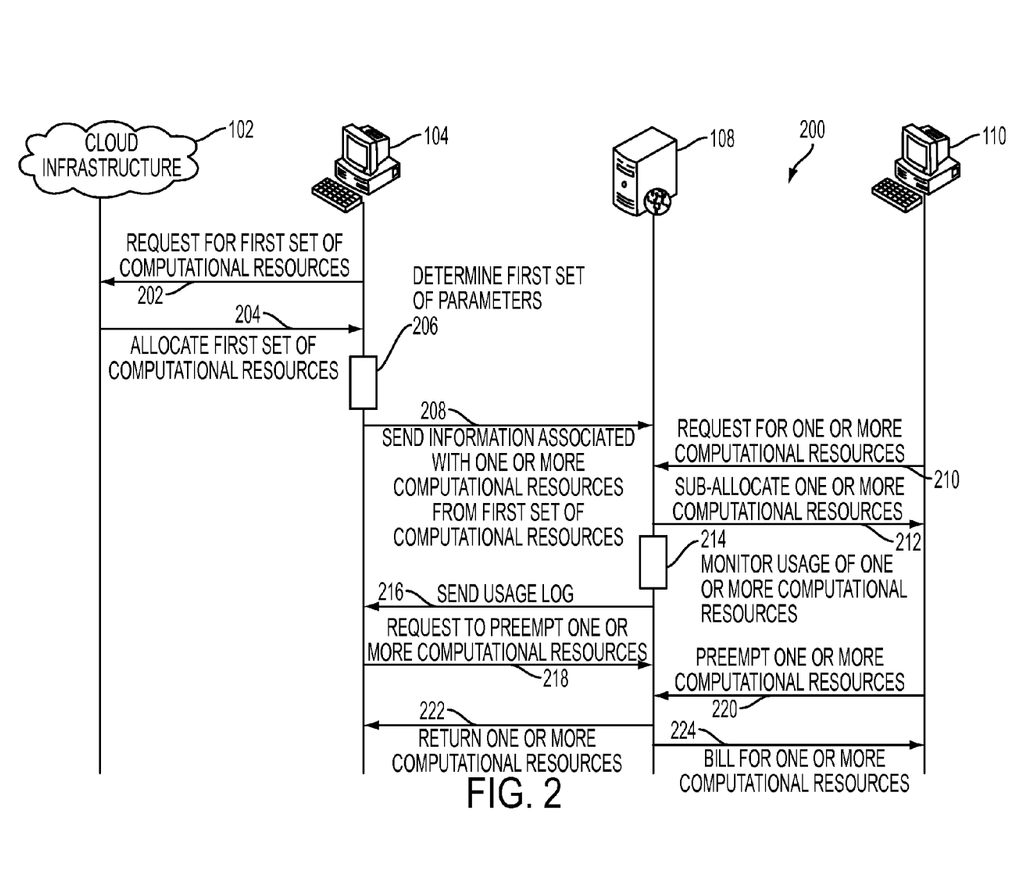
FIG. 2 is a message flow diagram illustrating flow of messages/data between various components of system environment in accordance with at least one embodiment.

FIG. 2 is a message flow diagram 200 illustrating the flow of messages/data between various components of the system environment 100, in accordance with at least one embodiment.

The first computing device 104 sends a request for a first set of computational resources to the cloud infrastructure 102 (depicted by 202). The cloud infrastructure 102 looks up for the SLA between the first computing device 104 and the cloud infrastructure 102. Based on the SLA, the cloud infrastructure 102 allocates the first set of computational resources to the first computing device 104 (depicted by 204). In an embodiment, the cloud infrastructure 102 allocates one or more virtual machines to the first computing device 104. The configuration of the one or more virtual machines corresponds to the first set of computational resources. For example, the cloud infrastructure 102 has a first set of virtual machines that has the following configuration:

Processor: 1 GHz (single core);
RAM: 256 MB; and
Storage: 10 GB.

The cloud infrastructure 102 allocates two of the first set of virtual machines to the first computing device 104. Then, the first computing device 104 would have two processors (1 GHz), 512 MB of RAM space, and 20 GB of storage as the first set of computational resources.

In an embodiment, the first computing device 104 receives a workflow that includes one or more processes or services that the first computing device 104 executes to perform an operation. The first computing device 104 determines a first set of parameters associated with the workflow (depicted by 206). In an embodiment, the first set of parameters includes, but is not limited to, the network bandwidth, processor instances, RAM, and the storage space, required by the workflow. The first computing device 104 compares the first set of parameters with a second set of parameters associated with a peak workload. Based on the comparison, the first computing device 104 determines one or more computational resources from the first set of computational resources that can be reserved for the peak workload. For example, based on the current workflow, the first computing device 104 determines that the current workflow is utilizing one processor instance, 128 MB RAM, and 5 GB storage space. Further, the first computing device 104 determines that during peak workload, the first computing device 104 would require two processor instances, 512 MB RAM, and 20 GB storage space. Thus, the first computing device 104 can reserve one processor instance, 384 MB RAM, and 15 GB storage space for the peak workload.

In an embodiment, the first computing device 104 communicates information associated with the one or more computational resources to the online marketplace server 108 (depicted by 208). The online marketplace server 108 publishes the availability of the one or more computational resources. Along with publishing the availability of the one or more computational resources, the online marketplace server 108 publishes an SLA associated with the one or more computational resources. In an embodiment, the SLA includes pricing details of the one or more computational resources.

At least one of the second computing devices 110 send a request to the online marketplace server 108 for the one or more computational resources (depicted by 210). The online marketplace server 108 sub-allocates the one or more computational resources to the at least one of the second computing devices 110 (depicted by 212).

The online marketplace server 108 monitors the usage of the one or more computational resources (depicted by 214) by the at least one of the second computing devices 110. Furthermore, the online marketplace server 108 maintains a log of the usage of the one or more computational resources. The online marketplace server 108 communicates the usage log to the first computing device 104 (depicted by 216).

During the peak workload, the first computing device 104 sends a request to the online marketplace server 108 to preempt the one or more computational resources (depicted by 218). On receiving the request, the online marketplace server 108 preempts the one or more computational resources from the at least one of the second computing devices 110 (depicted by 220). In an embodiment, the online marketplace server 108 preempts the one or more computational resources without any notification to the at least one of the second computing devices 110. In an alternate embodiment, the online marketplace server 108 sends a notification about preemption of the one or more computational resources. The online marketplace server 108 returns the one or more computational resources to the first computing device 104 (depicted by 222). Furthermore, the online marketplace server 108 bills the at least one of the second computing devices 110, based on the usage log (depicted by 224).

Figure 3:
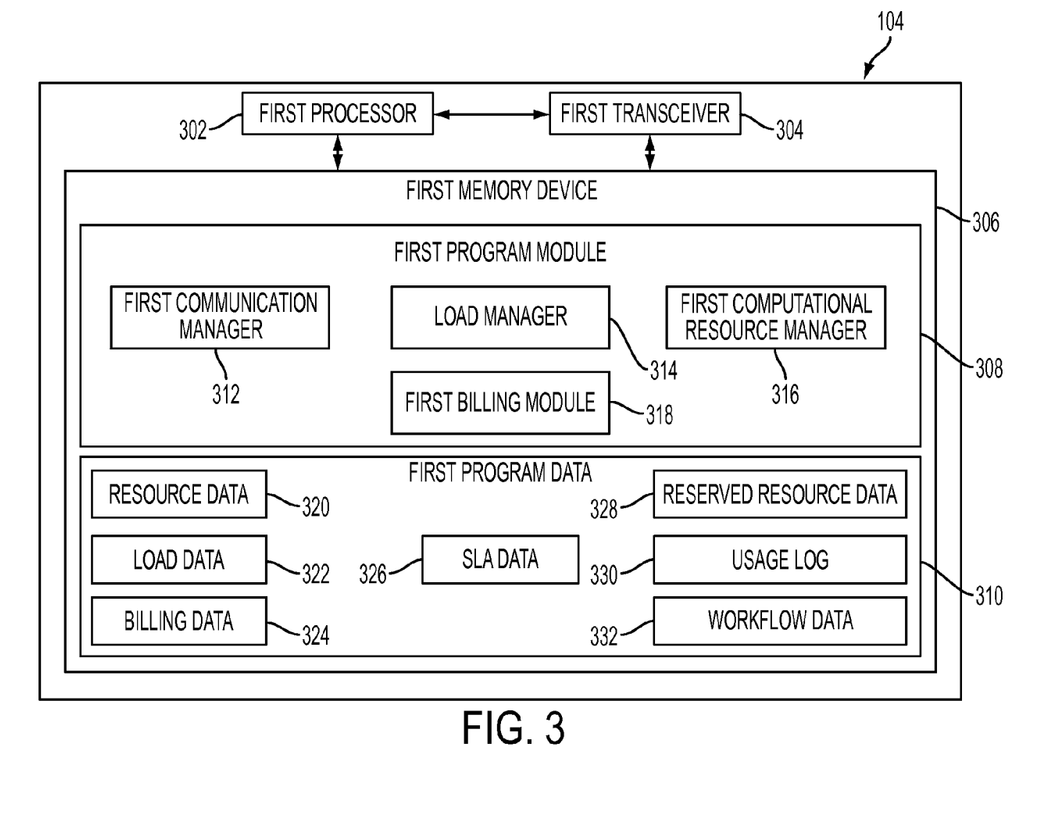
FIG. 3 is a block diagram of a first computing device in accordance with at least one embodiment.

FIG. 3 is a block diagram of the first computing device 104 in accordance with at least one embodiment. The first computing device 104 includes a first processor 302, a first transceiver 304, and a first memory device 306.

The first processor 302 is coupled to the first transceiver 304 and the first memory device 306. The first processor 302 executes a set of instructions stored in the first memory device 306. The first processor 302 can be realized through a number of processor technologies known in the art. Examples of the first processor 302 can be, but are not limited to, X86 processor, RISC processor, ASIC processor, CISC processor, ARM processor, or any other processor.

The first transceiver 304 transmits and receives messages and data to/from the various components of the system environment 100 (e.g., the cloud infrastructure 102, online marketplace server 108, and the second computing devices 110). Examples of the first transceiver 304 can include, but are not limited to, an antenna, an Ethernet port, a USB port or any port that can be configured to receive and transmit data from external sources. The first transceiver 304 transmits and receives data/messages in accordance with various communication protocols, such as, Transmission Control Protocol and Internet Protocol (TCP/IP), User Datagram Protocol (UDP), 2G, 3G and 4G communication protocols.

The first memory device 306 stores a set of instructions and data. Some of the commonly known memory implementations can be, but are not limited to, random access memory (RAM), read only memory (ROM), hard disk drive (HDD), and secure digital (SD) card. The first memory device 306 includes a first program module 308 and a first program data 310. The first program module 308 includes a set of instructions that can be executed by the first processor 302 to perform one or more operations on the first computing device 104. The first program module 308 includes a first communication manager 312, a first computational resource manager 316, a load manager 314, and a first billing module 318. Although, various modules in the first program module 308 have been shown in separate blocks, it may be appreciated that one or more of the modules may be implemented as an integrated module performing the combined functions of the constituent modules.

The first program data 310 includes a resource data 320, a load data 322, a billing data 324, an SLA data 326, a reserved resource data 328, a usage log data 330, and the workflow data 332.

The first communication manager 312 receives information associated with the first set of computational resources from the cloud infrastructure 102. The first communication manager 312 stores the information associated with the first set of computational resources as the resource data 320. Further, the first communication manager 312 communicates information associated with the one or more computational resources from the first set of computational resources to the online marketplace server 108. Additionally, the first communication manager 312 receives a workflow for the first computing device 104. The first communication manager 312 may transmit and receive messages/data in accordance with various protocols such as, but not limited to, Transmission Control Protocol and Internet Protocol (TCP/IP), User Datagram Protocol (UDP), 2G, 3G, or 4G communication protocols.

The load manager 314 monitors the workflow received by the first computing device 104. The load manager 314 determines the first set of parameters associated with the workflow. In an embodiment, the first set of parameters includes a measure of memory space, storage space, and processing instances, required by the workflow. In an embodiment, the load manager 314 maintains a historical data pattern of the first set of parameters associated with the workflow. Further, the load manager 314 stores the historical data pattern as the workflow data 332. In an embodiment, the load manager 314 schedules the usage of the first set of computational resources, based on the workflow data 332 and the first set of parameters associated with the workflow. Based on the scheduling of the usage of the first set of computational resources, the load manager 314 reserves one or more computational resources from the first set of computational resources for the peak workload. Further, the load manager 314 stores the metadata associated with the one or more computational resources as the reserved resource data 328.

The first computational resource manager 316 uses the information associated with the first set of computational resources to utilize the first set of computational resources to perform a predetermined operation. In an embodiment, the first computational resource manager 316 utilizes the first set of computational resources along with the first processor 302, and the first memory device 306 to perform the predetermined operation. For example, the first set of computational resources includes two processor instances; the first computational resource manager 316 would enable the first computing device 104 to perform an operation using the first processor 302 and the two processor instances. In an embodiment, the first computational resource manager may utilize the first set of computational resources using one or more remote access terminals such as, Microsoft® remote desktop ssh terminal, Putty, JAVA interface, etc.

The first billing module 318 maintains a usage log of the first set of computational resources. In an embodiment, the first billing module 318 maintains a usage log associated with the usage of the one or more computational resources by the second computing devices 110. Furthermore, the first billing module 318 stores the usage log as the usage log data 330. In an alternate embodiment, the first billing module 318 receives the usage log from the online marketplace server 108. Based on the usage log, the first billing module 318 bills the second computing devices 110.

Figure 4:
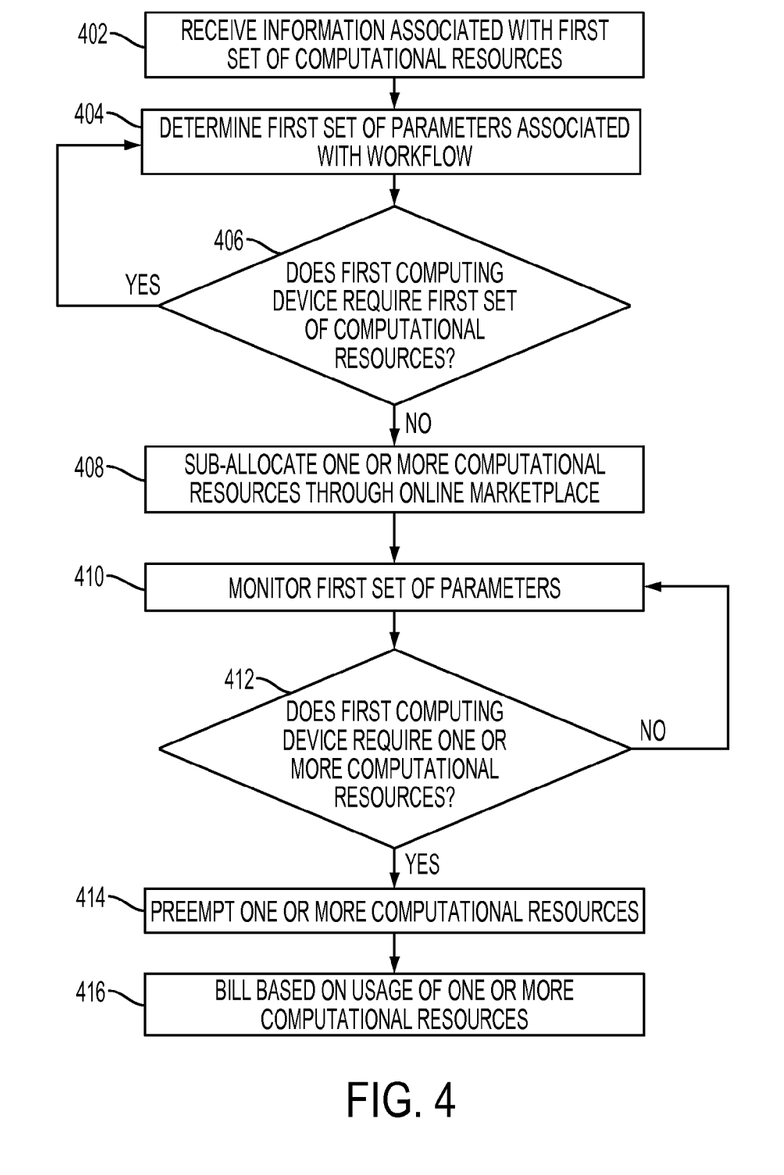
FIG. 4 is a flowchart illustrating a method implemented on a first computing device in accordance with at least one embodiment.

FIG. 4 is a flowchart 400 illustrating a method implemented on the first computing device 104 in accordance with at least one embodiment.

At step 402, information associated with the first set of computational resources is received by the first computing device 104. In an embodiment, the first communication manager 312 receives the information associated with first set of computational resources from the cloud infrastructure 102, based on the SLA between the first computing device 104 and the cloud infrastructure 102. The first communication manager 312 stores the information associated with the first set of computational resources as the resource data 320.

Concurrently, the first computing device 104 receives a workflow from the users of the first computing device 104. The first computational resource manager 316 utilizes the first set of computational resources, along with the first processor 302 and the first memory device 306 to process the workflow.

At step 404, the first set of parameters associated with the workflow is determined. In an embodiment, the load manager 314 determines the first set of parameters. Further, the load manager 314 analyzes the first set of parameters associated with the workflow to reserve one or more computational resources from the first set of computational resources for a peak workload (as described in 206).

At step 406, a check is performed to ascertain whether the first computing device 104 requires the one or more computational resources. In an embodiment, the first computational resource manager 316 performs the check, based on the first set of parameters associated with the workflow. If, at step 406, it is determined that the first computing device 104 needs the one or more computational resources, step 404 is repeated. If, at step 406, it is determined that the first computing device 104 does not need the one or more computational resources, step 408 is performed.

At step 408, the one or more computational resources are sub-allocated to the second computing devices 110 through the online marketplace server 108. In an embodiment, the first computational resource manager 316 allocates the one or more computational resources. In an embodiment, the sub-allocation includes communicating information associated with the one or more computational resources to the online marketplace server 108. In an embodiment, the online marketplace server 108 further sub-allocates the one or more computational resources to the second computing devices 110 based on the information associated with the one or more computational resources.

At step 410, the first set of parameters associated with the workflow is monitored. In an embodiment, the load manager 314 monitors the first set of parameters.

At step 412, a check is performed to ascertain whether the first computing device 104 requires the one or more computational resources. If, at step 412, it is determined that the first computing device 104 does not need the one or more computational resources, step 410 is repeated. However, if, at step 412, it is determined that the first computing device 104 needs the one or more computational resources, step 414 is performed. In an embodiment, the first computing device 104 requires the one or more computational resources during peak workload. At step 414, the one or more computational resources are preempted from the second computing devices 110 through the online marketplace server 108. In an embodiment, the first computational resource manager 316 preempts the one or more computational resources.

Subsequent to the preempting of the one or more computational resources, the first billing module 318 receives a usage log associated with the usage of the one or more computational resources.

At step 416, the second computing devices 110 are billed based on the usage log. In an embodiment, the first billing module 318 bills the second computing devices 110.

Figure 5:
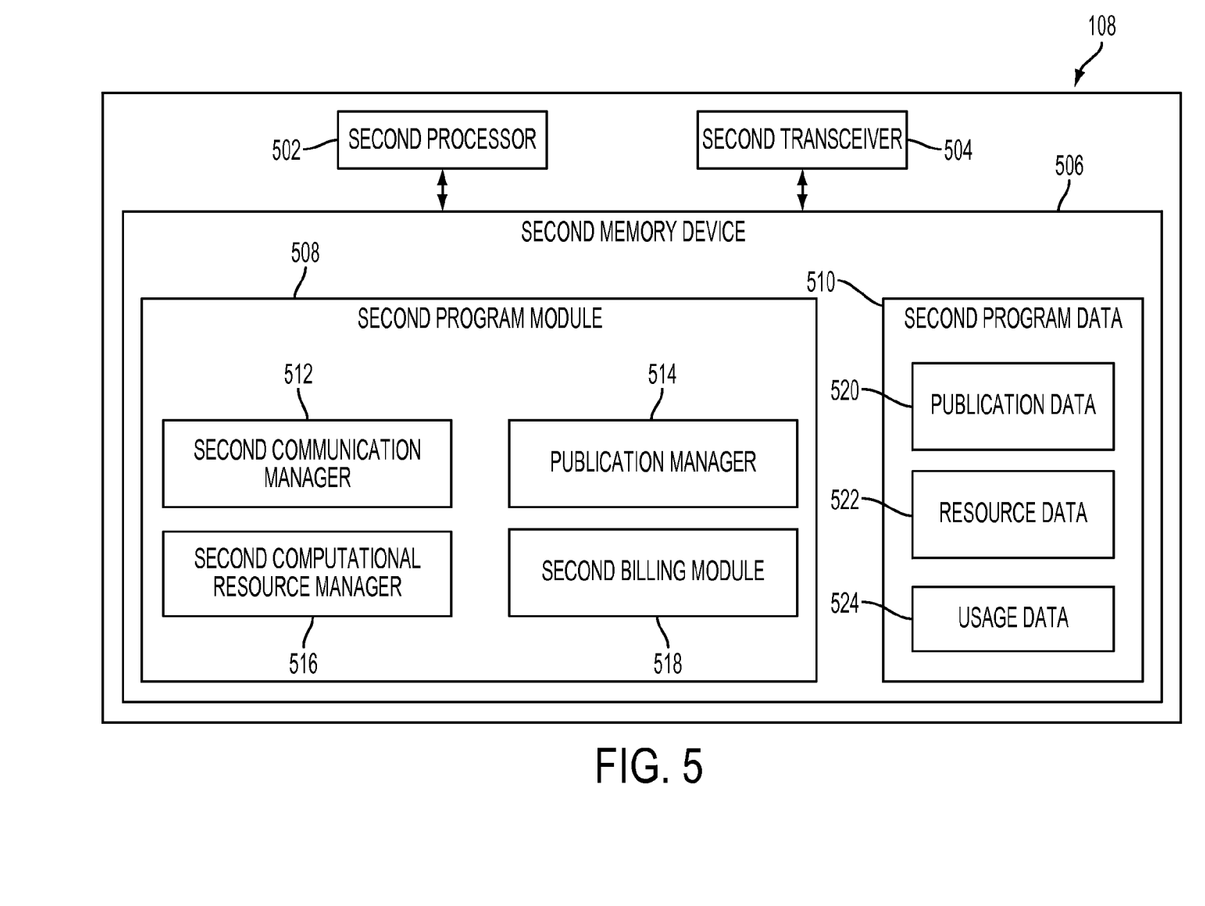
FIG. 5 is a block diagram of an online marketplace server in accordance with at least one embodiment.

FIG. 5 is a block diagram of the online marketplace server 108, in accordance with at least one embodiment. The online marketplace server 108 includes a second processor 502, a second transceiver 504, and a second memory device 506.

The second processor 502 is coupled to the second transceiver 504 and the second memory device 506. The second processor 502 executes a set of instructions stored in the second memory device 506. The second processor 502 can be realized through a number of processor technologies known in the art. Examples of the second processor 502 can be, but are not limited to, X86 processor, RISC processor, ASIC processor, CISC processor, ARM processor, or any other processor.

The second transceiver 504 transmits and receives messages and data to/from the various components (e.g., the cloud infrastructure 102, the first computing device 104, and the second computing devices 110) of the system environment 100 (refer FIG. 1). Examples of the second transceiver 504 can include, but are not limited to, an antenna, an Ethernet port, a USB port or any port that can be configured to receive and transmit data from external sources. The second transceiver 504 transmits and receives data/messages in accordance with various communication protocols, such as, Transmission Control Protocol and Internet Protocol (TCP/IP), User Datagram Protocol (UDP), 2G, 3G and 4G communication protocols.

The second memory device 506 stores a set of instructions and data. In an embodiment, the second memory device 506 is similar to the first memory device 306. Further, all the embodiments applicable to the first memory device 306 are also applicable to the second memory device 506. The second memory device 506 includes a second program module 508 and a second program data 510. The second program module 508 includes a set of instructions that can be executed by the second processor 502 to perform one or more operations on the online marketplace server 108. The second program module 508 includes a second communication manager 512, a publication manager 514, a second computational resource manager 516, and a second billing module 518.

The second program data 510 includes a publication data 520, a resource data 522, and a usage data 524.

The second communication manager 512 receives information associated with the one or more computational resources from the first computing device 104. Furthermore, the second communication manager 512 stores the information as the resource data 522. In an embodiment, the second communication manager 512 is similar to the first communication manager 312. Furthermore, all the embodiments applicable to the first communication manager 312 are also applicable to the second communication manager 512.

The publication manager 514 publishes the availability of the one or more computational resources. In an embodiment, the publication manager 514 publishes the availability of the one or more computational resources on a website hosted by the online marketplace server 108. It should be apparent to a person having ordinary skill, that the scope of the disclosure should not be limited to publishing the availability of the one or more computational resources on the website. The availability of one or more computational resources can be published on a portal, an application programming interface (API), a blog, and the like. In an embodiment, the publication manager 514 utilizes one or more scripting languages, such as, but not limited to, html, html 5, Java script, and Cgi script, to publish the availability of the one or more computational resources. In an embodiment, the publication manager 514 can be implemented using one or more technologies such as, but are not limited to, Apache web server, IIS, Nginx, and GWS.

The second computational resource manager 516 receives the request for the one or more computational resources from at least one of the second computing devices 110 through the second communication manager 512. On receiving the request, the second computational resource manager 516 sub-allocates the one or more computational resources to the at least one of the second computing devices 110. In an embodiment, the second computational resource manager 516 performs one or more checks associated with the integrity of the at least one of the second computing devices 110 prior to sub-allocation of the one or more computational resources. Further, the second computational resource manager 516 monitors the usage of the one or more computational resources. Additionally, the second computational resource manager 516 stores the usage details of the one or more computational resources as the usage data 524. In an embodiment, the second computational resource manager 516 receives a request to preempt the one or more computational resources from the first computing device 104. On receiving the request, the second computational resource manager 516 preempts the one or more computational resources from the at least one of the second computing devices 110.

The second billing module 518 bills the at least one of the second computing devices 110 based on the usage data 524. In an alternate embodiment, the second billing module 518 receives the bill details from the first computing device 104.

Figure 6:
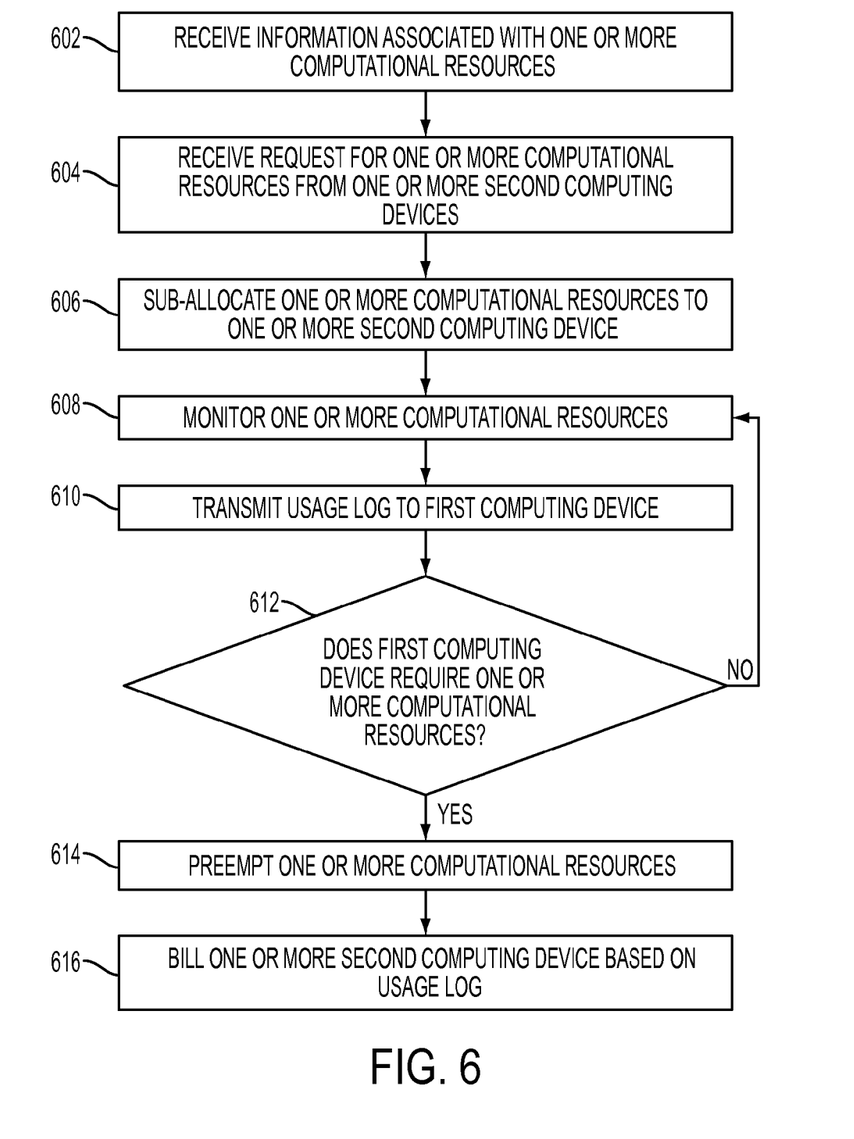
FIG. 6 is a flowchart illustrating a method implemented on an online marketplace server in accordance with at least one embodiment.

FIG. 6 is a flowchart 600 illustrating a method implemented on the online marketplace server 108, in accordance with at least one embodiment. At step 602, the information associated with the one or more computational resources is received from the first computing device 104. In an embodiment, the second communication manager 512 receives the information associated with the one or more computational resources. The second communication manager 512 stores the information associated with the one or more computational resources as the resource data 522.

On receiving the information associated with the one or more computational resources, the publication manager 514 publishes the availability of the one or more computational resources. In an embodiment, the publication manager 514 publishes an SLA associated with the one or more computational resources, probable duration for which the one or more computational resources are available, communication protocols required to access the one or more computational resources, and so forth.

At step 604, a request for the one or more computational resources is received from at least one of the second computing devices 110. In an embodiment, the second communication manager 512 receives the request through at least one of the portal, the website, the application programming interface (API), or the blog.

At step 606, the one or more computational resources are sub-allocated to the at least one of the one or more second computing devices 110 based on the SLA. In an embodiment, the second computational resource manager 516 sub-allocates the one or more computational resources.

At step 608, the usage of the one or more computational resources is monitored. In an embodiment, the second computational resource manager 516 monitors the usage of the one or more computational resources. In an embodiment, the second computational resource manager 516 generates a usage log corresponding to the usage of the one or more computational resources. Further, the second computational resource manager 516 stores the usage log as the usage data 524.

At step 610, the usage log is transmitted to the first computing device 104. In an embodiment, the second computational resource manager 516 transmits the usage log through the second communication manager 512.

At step 612, a check is performed to ascertain whether a request for the one or more computational resources was received from the first computing device 104. In an embodiment, the second computational resource manager 516 performs the check. If at step 612 it is determined that no request was received from the first computing device 104, steps 608-612 are repeated. If at step 612 it is determined that the request for the one or more computational resources has been received, step 614 is performed.

At step 614, the one or more computational resources are preempted from the at least one of the second computing devices 110. In an embodiment, the second computational resource manager 516 preempts the one or more computational resources. Further, the one or more computational resources are transmitted back to the first computing device 104 through the second communication manager 512.

At step 616, the at least one of the second computing devices 110 are billed based on the usage of the one or more computational resources. In an embodiment, the second billing module 518 bills the at least one of the second computing devices 110. In an alternate embodiment, the second billing module 518 receives the billing details from the first computing device 104.

The above disclosed embodiments illustrates that the first computing device 104 allocates the one or more computational resources through the online marketplace server 108. However, it will be apparent to a person having ordinary skill that the scope of the disclosure is not limited to sub-allocation of the one or more computational resources through the online marketplace server 108. The first computing device 104, can directly sub-allocate the one or more computational resources to the one or more second computing devices 110.

In such a case, the first computing device 104 includes a publishing module. In an embodiment, the publishing module hosts a website using one or more web hosting applications such as, but is not limited to, Apache®, IIS, Nginx, and GWS. Further, the publishing module publishes the availability of the one or more computational resources on the website along with the SLA associated with the one or more computational resources. At least one of the second computing devices 110 sends a request for the one or more computational resources to the first computing device 104 through the website.

On receiving the request, the first computational resource manager 316 sub-allocates the one or more computational resources to the at least one of the second computing devices 110. The first computational resource manager 316 sends the information associated with the one or more computational resources to the at least one of the second computing devices 110. Further, the first computational resource manager 316 monitors the usage of the one or more computational resources by the at least one of the second computing devices 110.

During peak workload, the first computing device 104 preempts the one or more computational resources from the at least one of the second computing devices 110. The first billing module 318 bills the at least one of the second computing devices 110 based on the usage of the one or more computational resources.

The disclosed embodiments encompass various advantages. The first computing device 104 receives the first set of computational resources from the cloud infrastructure 102. The first computing device 104 reserves the one or more computational resources from the first set of computational resources for the peak workload. The first computing device 104 sub-allocates one or more computational resources to the second computing devices 110. Further, the one or more computational resources can be preempted based on the need the first computing device 104. The first computing device 104 bills the second computing devices 110, based on the usage of the one or more computational resources. Therefore, sub-allocating the one or more computational resources might be profitable for the first computing device 104. Furthermore, the one or more computational resources are not kept idle until the peak workload. During the non-peak workload, the one or more computational resources are utilized by the second computing devices 110. Thus, the one or more computational resources are efficiently utilized.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, the Internet, and a network. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a Solid-state drive (SSD), optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer readable instructions may include various commands that instruct the processing machine to perform specific tasks such as, steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++', 'Visual Basic', JAVA, Python, and Ruby on Rails. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the disclosure titled "method and systems for sub-allocating computational resources" have been disclosed. However, it should be apparent to those skilled in the art that many more modifications, besides those described, are possible without departing from the inventive concepts herein. The embodiments, therefore, are not to be restricted, except in the spirit of the disclosure.

Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method implementable on a first computing device for allocating one or more computational resources, the method comprising:

receiving, by one or more processors, information associated with a first set of computational resources from a cloud infrastructure, wherein the first set of computational resources have been allocated to the first computing device by the cloud infrastructure;

determining, by the one or more processors, one or more computational resources from the first set of computational resources based on a comparison between a first set of parameters associated with a workflow received by the first computing device and a second set of parameters associated with a peak workflow, wherein the first set of parameters and the second set of parameters are indicative of computational resources for processing the workflow and the peak workflow, respectively;

allocating, by a marketplace server, the identified one or more computational resources to a second computing device;

monitoring, by the one or more processors, the first computing device such that the first set of parameters is monitored; and instructing, by the one or more processors, the market place server to preempt the allocated one or more computational resources based on the monitoring, wherein the preempting comprises withdrawing the allocation of the identified one or more computational resources from the second computing device; and allocating, by the marketplace server, the preempted computational resources to the first computing device.

2. The method of claim 1, wherein the first set of computational resources are received based on a service level agreement (SLA) between the cloud service provider and the first computing device.

3. The method of claim 1, wherein the first set of computational resources comprises RAM, processors, and storage space.

4. The method of claim 1, wherein the first set of parameters comprises network bandwidth required by the workflow, processor instances required by the workflow, memory space required by the workflow, and storage space required by the workflow.

5. The method of claim 1 further comprising billing, by the one or more processors, the one or more second computing devices based on a usage of the one or more computational resources.

6. The method of claim 1, wherein information associated with the first set of computational resources comprises at least one of an IP address associated with the first set of computational resources, RAM address, or Storage Space address.

7. The method of claim 1, wherein the one or more computational resources are preempted when the monitoring indicates that the first computing device is experiencing a peak workload.

8. A method implementable on an online marketplace server for allocating one or more computational resources, the method comprising:
receiving, by one or more processors, information pertaining to the one or more computational resources from one or more first computing devices;
receiving, by the one or more processors, a first request for the one or more computational resources from one or more second computing devices;
allocating, by the one or more processors, the one or more computational resources to the one or more second computing devices;
monitoring, by the one or more processors, usage of the one or more computational resources;
receiving, by the one or more processors, from at least one first computing device, a second request to preempt the one or more allocated computational resources associated with the at least one first computing device, wherein the at least one first computing device transmits the second request when the at least one computing device receives a peak workload;
preempting, by the one or more processors, the one or more allocated computational resources, wherein the preempting comprises withdrawing the allocation of the identified one or more computational resources from the second computing device;
allocating, by the marketplace server, the preempted computational resources to the first computing device; and
billing, by the one or more processors, the one or more second computing devices based on the usage.

9. The method of claim 8 further comprising publishing an availability of the one or more computational resources on an online marketplace.

10. The method of claim 8 further comprising transmitting a usage log of the one or more computational resources to the one or more first computing devices, wherein the usage log is created based on the monitoring.

11. The method of claim 8, wherein the one or more first computing devices receives information associated with a first set of computational resources from a cloud service provider, wherein the one or more first computing devices sends the information associated with the one or more computational resources from the first set of computational resources to the online marketplace server.

12. The method of claim 8, wherein the one or more computational resources are preempted when the first computing device is experiencing a peak workload.

13. A first computing device for allocating one or more computational resources, the first computing device comprising:
a processor and memory;
a first computational resource manager configured to receive information associated with a first set of computational resources from a cloud service provider, wherein the first set of computational resources have been allocated to the first computing device by the cloud infrastructure;
a load manager configured to determine one or more computational resources from the first set of computational resources based on a comparison between a first set of parameters associated with a workflow received by the first computing device and a second set of parameters associated with a peak workflow, wherein the first set of parameters and the second set of parameters are indicative of computational resources for processing the workflow and the peak workflow, respectively; and
a marketplace server configured to allocate the one or more computational resources to a second computing device that comprises a processor and memory;
wherein the load manager is further configured to monitor the first computing device such that the first set of parameters is monitored,
wherein the first computational resource manager is further configured to instruct the market place server to preempt the allocated one or more computational resources based on the monitoring, the preempting comprising withdrawing the allocation of the identified one or more computational resources from the second computing device, and
wherein the marketplace server is further configured to allocate the preempted computational resources to the first computing device.

14. The first computing device of claim 13 further comprising a billing module configured to bill the one or more second computing devices based on a usage of the one or more computational resources, wherein the one or more computational resources are allocated to the one or more second computing devices.

15. The first computing device of claim 13, wherein the one or more computational resources are preempted when the monitoring indicates that the first computing device is experiencing a peak workload.

16. An online marketplace server for allocating one or more computational resources, the online marketplace server comprising:
a processor and memory;
a communication manager configured to receive information pertaining to the one or more computational resources from one or more first computing devices;
the communication manager configured to receive a first request from one or more second computing devices for the one or more computational resources;
a second computational resource manager configured to:
allocate the one or more computational resources to the one or more second computing devices that comprise processors and memory; and monitor usage of the one or more computational resources;

receive, from at least one first computing device, a second request to preempt the one or more allocated computational resources associated with the at least one first computing device, wherein the at least one first computing device transmits the second request when the at least one computing device receives a peak workload;

preempt the one or more allocated computational resources, wherein the preempting comprises withdrawing the allocation of the identified one or more computational resources from the second computing device; and allocate the preempted computational resources to the first computing device; and a billing module configured to bill the one or more second computing devices based on the usage.

17. The online marketplace server of claim 16 further comprising a publication manager configured to publish the availability of the one or more computational resources on an online marketplace.

18. The online marketplace server of claim 16, wherein the online marketplace correspond to a portal, a website, an application programming interface (API) and a blog.

19. The online marketplace server of claim 16, wherein the one or more computational resources are preempted when the monitoring indicates that the first computing device is experiencing a peak workload.

* * * * *